(12) United States Patent
Wong (10) Patent No.: US 8,825,702 B2
(45) Date of Patent: Sep. 2, 2014

(54) SENDING CONTROL INFORMATION WITH DATABASE STATEMENT

(75) Inventor: Daniel Manhung Wong, Sacramento, CA (US)

(73) Assignee: Oracle International Corporation, Redwood Shores, CA (US)

(*) Notice: Subject to any disclaimer, the term of this patent is extended or adjusted under 35 U.S.C. 154(b) by 2190 days.

(21) Appl. No.: 10/786,941

(22) Filed: Feb. 24, 2004

(65) Prior Publication Data

US 2005/0187958 A1     Aug. 25, 2005

(51) Int. Cl.
*G06F 7/00*     (2006.01)
*G06F 17/30*    (2006.01)

(52) U.S. Cl.
CPC .... *G06F 17/30421* (2013.01); *G06F 17/30306* (2013.01); *G06F 17/30522* (2013.01)
USPC ......................................................... 707/781

(58) Field of Classification Search
USPC .............................................. 707/1–100, 781
See application file for complete search history.

(56) References Cited

U.S. PATENT DOCUMENTS

| | | | |
|---|---|---|---|
| 5,133,075 A | 7/1992 | Risch ............................... | 706/53 |
| 5,241,305 A | 8/1993 | Fascenda et al. ............. | 340/7.43 |
| 5,276,901 A | 1/1994 | Howell et al. .................. | 395/800 |
| 5,335,346 A | 8/1994 | Fabbio | |
| 5,499,368 A | 3/1996 | Tate et al. .......................... | 707/4 |
| 5,659,539 A | 8/1997 | Porter et al. | |
| 5,659,738 A | 8/1997 | Letkeman et al. | |
| 5,694,523 A | 12/1997 | Wical | |
| 5,708,822 A | 1/1998 | Wical | |
| 5,737,736 A | 4/1998 | Chang | |
| 5,748,899 A | 5/1998 | Aldrich .......................... | 709/222 |
| 5,768,580 A | 6/1998 | Wical | |
| 5,784,699 A | 7/1998 | McMahon et al. | |
| 5,787,428 A * | 7/1998 | Hart ................................ | 707/9 |
| 5,809,266 A | 9/1998 | Touma et al. | |
| 5,832,226 A | 11/1998 | Suzuki et al. | |
| 5,845,128 A | 12/1998 | Noble et al. | |
| 5,857,180 A | 1/1999 | Hallmark et al. | |

(Continued)

FOREIGN PATENT DOCUMENTS

| | | |
|---|---|---|
| EP | 1 089 194 A2 | 4/2001 |
| EP | 2002312220 | 10/2002 |
| JP | 2002-312220 | 10/2002 |
| JP | 2002/312220 | 10/2002 |

OTHER PUBLICATIONS

International Preliminary Examining Authority, "Written Opinion", PCT/US2003/041541, mailing date Sep. 1, 2005, 6 pages.
Current Claims, PCT/US2003/041541, 3 pages.

(Continued)

*Primary Examiner* — Robert Beausoliel, Jr.
*Assistant Examiner* — Michael Pham
(74) *Attorney, Agent, or Firm* — Hickman Palermo Truong Becker Bingham Wong LLP (57) ABSTRACT

Sending control information that is associated with a statement that controls how the statement is processed is disclosed. The information is available to the server even after the window session is closed. The information may be contained in a tag appended to the statement. In an embodiment, the information may be viewed by an administrator. The information may determine aspects of how the statement is executed that is not controlled by the execution engine. For example, the information may relate to security access, priority, quality of service, scheduling, and or use supplied routines.

26 Claims, 2 Drawing Sheets

(56) References Cited

U.S. PATENT DOCUMENTS

| | | | |
|---|---|---|---|
| 5,864,682 A | 1/1999 | Porter et al. | |
| 5,864,842 A | 1/1999 | Pederson et al. | |
| 5,870,759 A | 2/1999 | Bauer et al. | |
| 5,870,765 A | 2/1999 | Bauer et al. | |
| 5,884,325 A | 3/1999 | Bauer et al. | |
| 5,926,816 A | 7/1999 | Bauer et al. | 707/8 |
| 5,940,818 A | 8/1999 | Malloy et al. | 707/2 |
| 5,963,932 A | 10/1999 | Jakobsson et al. | |
| 5,978,818 A | 11/1999 | Lin | 715/501.1 |
| 6,035,298 A | 3/2000 | McKearney | |
| 6,061,675 A | 5/2000 | Wical | 706/45 |
| 6,073,163 A | 6/2000 | Clark et al. | 709/203 |
| 6,098,081 A | 8/2000 | Heidorn | 707/3 |
| 6,112,226 A | 8/2000 | Weaver et al. | 709/203 |
| 6,119,154 A | 9/2000 | Weaver et al. | 709/219 |
| 6,134,549 A | 10/2000 | Regnier et al. | |
| 6,134,558 A | 10/2000 | Hong et al. | 707/103 |
| 6,138,120 A | 10/2000 | Gongwer et al. | |
| 6,138,147 A | 10/2000 | Weaver et al. | 709/206 |
| 6,160,549 A | 12/2000 | Touma et al. | 715/762 |
| 6,199,034 B1 | 3/2001 | Wical | 704/9 |
| 6,225,995 B1 | 5/2001 | Jacobs et al. | 715/738 |
| 6,253,203 B1 | 6/2001 | O'Flaherty et al. | 707/9 |
| 6,266,673 B1 | 7/2001 | Hong et al. | |
| 6,275,824 B1 | 8/2001 | O'Flaherty et al. | 707/9 |
| 6,275,825 B1 | 8/2001 | Kobayashi et al. | |
| 6,295,610 B1 | 9/2001 | Ganesh et al. | |
| 6,308,273 B1 | 10/2001 | Goertzel et al. | 726/9 |
| 6,324,567 B2 | 11/2001 | Chidambaran et al. | |
| 6,334,114 B1 | 12/2001 | Jacobs et al. | |
| 6,363,387 B1 | 3/2002 | Ponnekanti et al. | 707/10 |
| 6,370,522 B1 | 4/2002 | Agarwal et al. | |
| 6,370,619 B1 | 4/2002 | Ho et al. | |
| 6,434,685 B1 | 8/2002 | Sexton et al. | |
| 6,449,609 B1 | 9/2002 | Witkowski | |
| 6,457,019 B1 | 9/2002 | Sexton et al. | |
| 6,470,423 B1 | 10/2002 | Ho et al. | |
| 6,487,545 B1 | 11/2002 | Wical | |
| 6,487,552 B1* | 11/2002 | Lei et al. | 707/4 |
| 6,493,722 B1 | 12/2002 | Daleen et al. | 707/104.1 |
| 6,499,095 B1 | 12/2002 | Sexton et al. | |
| 6,529,586 B1 | 3/2003 | Elvins et al. | |
| 6,529,885 B1 | 3/2003 | Johnson | |
| 6,539,398 B1 | 3/2003 | Hannan et al. | 707/103 |
| 6,549,916 B1 | 4/2003 | Sedlar | |
| 6,564,223 B1 | 5/2003 | Sexton et al. | |
| 6,578,037 B1* | 6/2003 | Wong et al. | 707/10 |
| 6,587,854 B1 | 7/2003 | Guthrie et al. | 707/9 |
| 6,591,295 B1 | 7/2003 | Diamond et al. | |
| 6,601,071 B1 | 7/2003 | Bowker et al. | |
| 6,604,182 B1 | 8/2003 | Sexton et al. | |
| 6,609,121 B1 | 8/2003 | Ambrosini et al. | 707/3 |
| 6,618,721 B1 | 9/2003 | Lee | |
| 6,631,371 B1 | 10/2003 | Lei et al. | |
| 6,678,697 B2 | 1/2004 | Sexton et al. | |
| 6,678,822 B1 | 1/2004 | Morar et al. | 713/182 |
| 6,684,227 B2 | 1/2004 | Duxbury | 707/203 |
| 6,708,186 B1 | 3/2004 | Claborn et al. | |
| 6,715,050 B2 | 3/2004 | Williams et al. | |
| 6,738,782 B2 | 5/2004 | Agarwal et al. | |
| 6,745,332 B1 | 6/2004 | Wong et al. | |
| 6,757,670 B1* | 6/2004 | Inohara et al. | 707/3 |
| 6,804,662 B1* | 10/2004 | Annau et al. | 707/2 |
| 6,847,998 B1 | 1/2005 | Arcieri et al. | 709/224 |
| 6,920,457 B2 | 7/2005 | Pressmar | 707/101 |
| 6,986,060 B1 | 1/2006 | Wong | |
| 6,996,557 B1 | 2/2006 | Leung et al. | |
| 7,117,197 B1 | 10/2006 | Wong et al. | |
| 7,499,907 B2* | 3/2009 | Brown et al. | 707/2 |
| 2001/0021929 A1* | 9/2001 | Lin et al. | 707/2 |
| 2002/0095405 A1 | 7/2002 | Fujiwara | |
| 2002/0099743 A1 | 7/2002 | Workman et al. | |
| 2002/0107892 A1 | 8/2002 | Chittu et al. | |
| 2002/0194191 A1 | 12/2002 | Sexton et al. | |
| 2003/0014394 A1* | 1/2003 | Fujiwara et al. | 707/3 |
| 2003/0079100 A1 | 4/2003 | Williams et al. | |
| 2003/0163460 A1* | 8/2003 | Shinn et al. | 707/3 |
| 2003/0212662 A1* | 11/2003 | Shin et al. | 707/2 |
| 2003/0220951 A1 | 11/2003 | Muthulingam et al. | |
| 2003/0233620 A1 | 12/2003 | Vedullapalli et al. | |
| 2003/0236781 A1 | 12/2003 | Lei et al. | |
| 2003/0236782 A1* | 12/2003 | Wong et al. | 707/5 |
| 2004/0030707 A1 | 2/2004 | Lu et al. | |
| 2004/0034618 A1 | 2/2004 | Lu et al. | |
| 2004/0034619 A1 | 2/2004 | Lu et al. | |
| 2004/0039732 A1* | 2/2004 | Huang | 707/3 |
| 2004/0054933 A1 | 3/2004 | Wong et al. | |
| 2004/0064466 A1* | 4/2004 | Manikutty et al. | 707/100 |
| 2004/0068586 A1 | 4/2004 | Xie et al. | |
| 2004/0139043 A1 | 7/2004 | Lei et al. | |
| 2004/0236724 A1* | 11/2004 | Chien et al. | 707/3 |
| 2004/0254948 A1* | 12/2004 | Yao | 707/101 |
| 2005/0050046 A1* | 3/2005 | Puz et al. | 707/9 |
| 2005/0177570 A1* | 8/2005 | Dutta et al. | 707/9 |
| 2007/0061456 A1* | 3/2007 | Waris | 709/225 |

OTHER PUBLICATIONS

Motro, Amihai, "An Access Authorization Model for Relational Databases Based on Algebraic Manipulation of View Definitions," Data Engineering, 1989, XP010015183.

Stonebraker, M. et al., "Access Control in a Relational Base Management System by Query Modification," XP-002319462, pp. 180-186.

Oracle Corporation, "Procedures and Packages, Name Resolution for Database Objects and Program Units," http://download-west.com/docs/dc/A87860_01/doc/server.817/a76965/c17pckgs.htm#, data retrieved Jan. 13, 2004, 1 page.

Oracle Corporation, "Summary of DBMS_SQL Subprograms," Oracle9i Supplied PL/SQL Packages and Types Reference, Release 2 (9.2), Part No. A96612-01, 2000, 2002, http://download-west.oracle.com/docs/cd/B10501_01/appdev.920/a96612/d_sq12.htm#10040, data retrieved Jan. 13, 2004, pp. 1-22.

Oracle Corporation, "Summary of Subprograms," Oracle 8i Supplied PL/SQL Packages Reference, Release 2 (8.1.6), Part No. A76936-01, http://download-west.oracle.com/docs/cd/A87860_01/docs/appdev.817/a76936/dbms_sq2.htm, data retrieved Jun. 14, 2004, pp. 1-35.

Oracle Corporation, "Subprograms," PL/SQL User's Guide and Reference, Release 8.1.6, Part No. A77069-01, 1996-2000, http://download-west.oracle.com/docs/cd/A87860_01/doc/appdev.817/a77069/07_subs.htm#, data retrieved Jan. 13, 2004, pp. 1-36.

European Patent Office, "Patent Cooperation Treaty", Application No. PCT/US2007/067747, dated Jun. 11, 2008, 6 pages.

Claims, Application No. PCT/US2007/067747, 6 pages.

Garcia-Molina, Hector, et al., "Database System Implementation", Prentice Hall, Department of Computer Science Stanford University, 2000, 27 pages.

Stonebraker, Michael, et al., "Access Control in a Relational Data Base Management System by Query Modification", ACM Press, Proceedings of the 1974 Annual Conference, 1974, 8 pages.

State Intellectual Property Office of P.R.C., "Notification of the First Office Action", Application No. 200380108699.3, mailed Oct. 26, 2007, 9 pages.

State Intellectual Property Office of P.R.C., "Notification of the Second Office Action", Application No. 200380108699.3, mailed Feb. 1, 2008, 9 pages.

Claims, Application No. 200380108699.3, 4 pages, WO 2004/066128, filed Dec. 30, 2003, Published May 8, 2004.

\* cited by examiner

SENDING CONTROL INFORMATION WITH DATABASE STATEMENT

FIELD OF THE INVENTION

The invention relates to database statements in general. More specifically, the invention relates to security access granted to and/or resources allocated to a database statement.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, unless otherwise indicated, it should not be assumed that a problem has been recognized by the prior art merely because the problem is discussed in this section.

For convenience of expression, various entities that represent sets of instructions (e.g. functions, queries) are described as performing actions, when in fact, a computer, process, database server, or other executing entity performs those actions in response to executing or interpreting the set of instructions. For example, a function may be described as determining that a condition exists or a query may be described as accessing information. These are just convenient ways of expressing that a computer, process, database server or other executing entity is determining that a condition exists in response to executing a function or is accessing data in response to executing or computing a query.

A database server, also referred to as a database management system (DBMS), retrieves and manipulates data in response to receiving a database statement. Typically the database statement conforms to a database language (e.g., a query language), such as Structured Query Language (SQL). A database statement can specify a query operation, a data manipulation operation, or a combination thereof. A database statement that specifies a query operation is referred to herein as a query. The present invention is not limited to database statements that specify a particular type of operation. Some other examples of database statements other examples of database statements are updates and deletes. However, for the purpose of explanation, embodiments of the present invention are illustrated using queries.

A database language, as the term is used herein, is a declarative language. A declarative language provides constructs for describing results but not steps performed to generate the results. The data base language SQL, for example, provides constructs for specify what data field to provide (e.g., the SELECT and FROM clauses specify the columns in the results), and the WHERE clause to specify criteria (e.g. a predicate) that the data should satisfy. The database statement is submitted to a database server, which has components that figure out how to compute the results, and the results are generated accordingly. See Kaufman et al., *Beginning SQL Programming*, Wrox Press Inc (March 2001), the contents of which are also incorporated herein by reference.

It is often useful to convey information about database statements to a database server other than information that only describes the results. Such information is referred to herein as database statement control information, or just control information. For example, it is useful to provide instructions to a query optimizer about how to generate an execution plan for a database statement. An approach for conveying such information is to use an "optimizer hint". An optimizer hint is an instruction embedded in a database statement that is interpreted by a query optimizer to assist it in determining an execution plan for executing a database statement. An optimizer hint may specify an index to scan when computing the results of a query. Optimizer hints and execution plan are described in further detail in Daniel ManHung Wong, et al., U.S. patent application Ser. No. 10/431,071, entitled "DYNAMIC GENERATION OF OPTIMIZER HINTS", the contents of which are incorporated herein by reference, and in *Oracle 9i Database Performance Guide and Reference*, Release 1 (9.0.1), Part Number A87503-02, the contents of which are also incorporated herein by reference.

A drawback of optimizer hints is that optimizer hints may be used for conveying information only about generating an execution plan. The information is only conveyed to the query optimizer, the component of database server responsible for generating execution plans. Often, it is useful to convey other types of control information to other components of a database server, such as security information to access control components of a database server, priority information to scheduling components of the database server, or information to non-native user-supplied components of database server (e.g., user-supplied functions).

One such mechanism that allows such information to be conveyed is the user context, which includes user context information. User context information is data which is maintained by a database server and that is associated with a database session. A database session is the establishment of a particular connection between a client and a database server through which a series of calls to the database server may be made. The period of time the client remains connected in the database session is referred to as the session window. Thus, the session window ends when the session is terminated.

A user context includes various attributes, such as the user id identifying the user associated with the database session and application id identifying an application associated with the database session. The user context information is accessed by the database server and its various components. For example, the user context information may be accessed by an access control component to determine access control information. Some attributes may be set only by a database server, by a user (via an API call), or by a user subject to certain security restrictions imposed by the database server. A user context is useful for storing and conveying information to various database server components.

A drawback to using a user context is that the information is only stored in memory allocated to database sessions, which is referred to herein as session space. The user context is stored in the session space of a database session, and therefore does not persist beyond the session window of the database session.

For example, within a database session, a user submits a query that is to be executed by a background process or background server at a later scheduled time. Subsequent to the end of the session window, the background process executes the query. Because the user context is no longer stored, it cannot be used to convey information to the background process when it computes the query.

Thus, there is a need for a mechanism that conveys control information other than to a query optimizer outside a database session.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for sending control information with database statements is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature may not address any of the problems discussed above or may only address one of the problems discussed above. Some of the problems discussed above may not be fully addressed by any of the features described herein. Although headings are provided, information related to a particular heading, but not found in the section having that heading, may also be found elsewhere in the specification.

Functional Overview

Sending control information with database statements (e.g., queries, updates, deletes, or any other type of database statement) is disclosed. Sending the control information with the database statements may provide information about the database statement that may be conveyed to other applications or database components. The control information provided may be used for allocating resources, for example. The control information may be appended to database statements by adding a tag to the database statement. The control information is executed by a background server, and is stored and available to the database server even after the user session has ended. In this specification, the term "background server" is used to refer to the objects, processes and/or threads that are associated with the database server that run in the background, without accessing the session space, without accessing the user context, or when the user is not connected to the database server. Some examples of control information are security information, priority information, or information specific to components supplied by the user to the database server. An example of security information is information related to which components or data the database statement may access. An example of priority information is a priority level that is used to determine which database statement is given priority, and executed first. Unlike optimizer hints, the control information may be supplied to the database server. Alternatively, the control information is supplied to other components in addition to or instead of the database server. For example, the security information may be supplied to security components, and the priority information may be supplied to scheduling components.

In an embodiment, the control information is also available to a systems administrator and/or to software that performs administrative functions such as scheduling the execution of programs. In an embodiment, the database execution interface includes a mechanism for binding a tag to each database statement. In an embodiment, unlike performance hints, the tag is interpreted by the database server. In an embodiment, the tag is extracted from and stored along with the corresponding database statement. In an embodiment, an interface is include that exposes the information associated with the tag allowing developers to extend the database server by modifying how the database server treats the database statements based on the new information. In an embodiment, the database application is able to communicate application specific preferences to the database server, further allowing developers to customize database server for the applications using the database server. The database server of an embodiment of the invention recognizes information passed in the tag, processes the information, and in response, enforces additional application policies, such as access control, quality of service, or auditing of the database server. The database server may use the information in the tags for prioritization, resource allocation, security access control, or many other purposes related to the database statement.

An Embodiment of the Database Server

Figure 1:
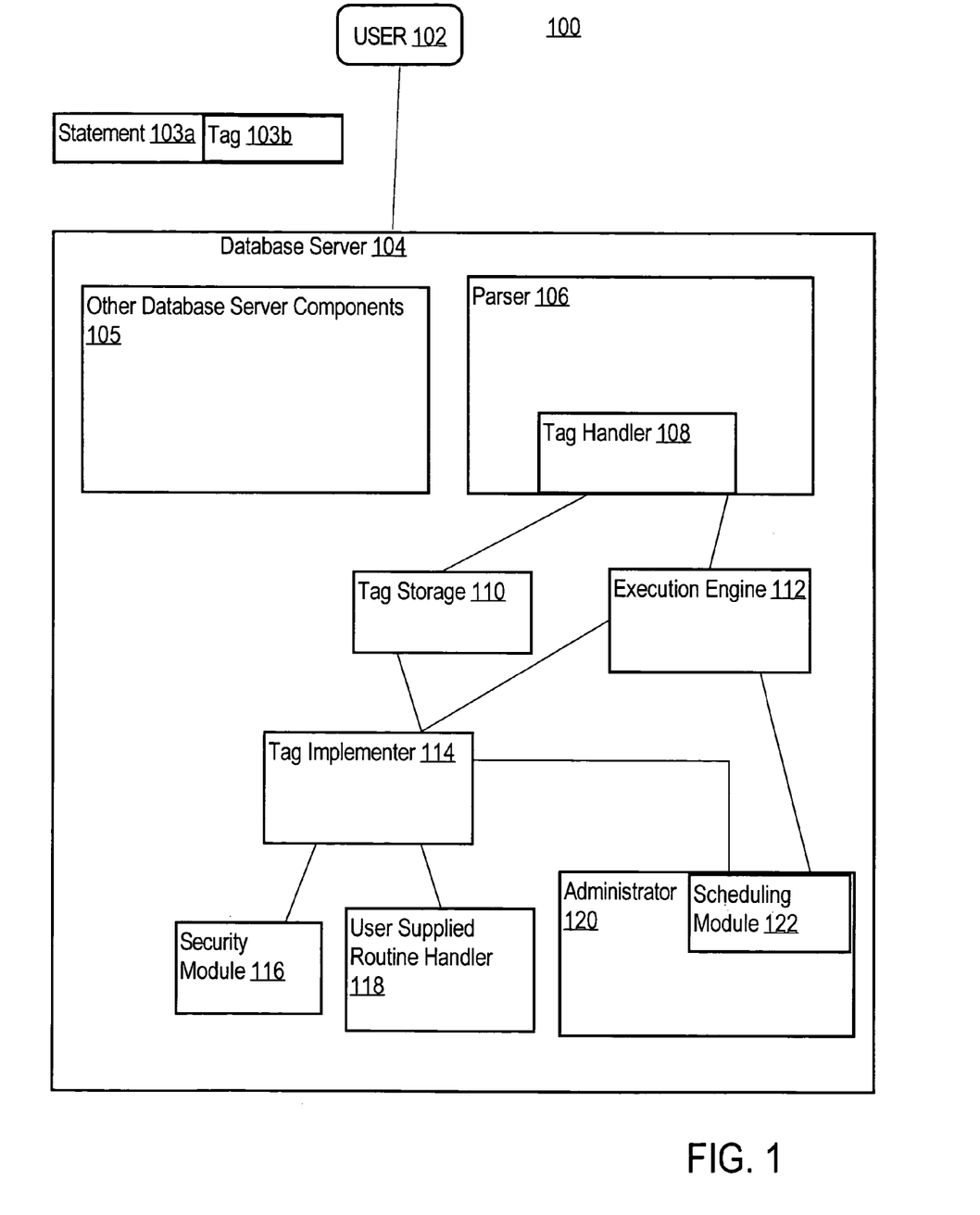
FIG. 1 shows a system in which control information is sent with a database statement, upon which an embodiment of the present invention may be implemented.

The contents of FIG. 1 are first described briefly. The brief description is followed by a more detailed description of each of the components of FIG. 1, which is followed by a discussion of how the components FIG. 1 cooperate together.

FIG. 1 shows a system 100 in which control information is sent with database statements, upon which an embodiment of the present invention may be implemented. System 100 includes user 102, statement 103a, tag 103b, and database server 104. Database server 104 includes other database components 105, parser 106, tag handler 108, tag storage 110, execution engine 112, tag implementer 114, security module 116, user supplied routine handler 118, administrator 120, and scheduling module 122. An alternative embodiment of system 100 and database server 104 may not include all of the components listed above or may contain other components in addition to or instead of those listed above.

User 102 is a user application, process or other object. User 102 is used for submitting database statements to the database server. Statement 103a is a database statement sent by user 102 for execution by a database server. Statement 103a may be a query, command, or any other type of database statement. Some examples of statement 103a are select statements, update statements, and delete statements. Statement 103a is one or more lines of code in a declarative language used for sending instructions to database servers.

Tag 103b includes control information such as information related to priority, quality of service, user identification, security, and/or user supplied routines that is appended to, attached to, sent with, embedded in or otherwise associated with database statement 103a. The control information provided via tag 103b may be used for allocating resources, for example. Tag 103b may used to convey information about the database statement to other applications or database components. Tag 103b may be in the format of a markup language, such as Extensible Markup Language (XML).

Database server 104 is a computer, computer peripheral, device on a network, and/or computer program that manages database resources and processes database statements. For example, database server 104 may include a database server or hardware that runs the database server. Database server 104 receives statement 103a and tag 103b. Database 104 parses and executes database statement 103a in accordance with the information contained in tag 103b, and then returns the results to user 102. For example, according to the information in tag 103b, statement 103a may be given a particular level of priority. Based on the priority level determined from tag 103b, database server 104 may process database statement a head of or after other database statements that have not yet been received, waiting to be processed, or that are currently being processed. Similarly, based on information in tag 103b database server 104 may restrict database statement 103a from accessing or granting database statement 103a access to information in, components associated with database server 104 and/or its associated database.

Other database components 105 is any hardware and/or software components that are included in database server 104 in addition to parser 106, tag handler 108, tag storage 110, execution engine 112, tag implementer 114, security module 116, user supplied routine handler 118, administrator 120, and scheduling module 122. Other database components 105 may include other components that are optional and/or other components that are necessary for database server 104 to function. For example, other database components 105 may include components for handling user sessions and user contexts.

Parser 106 parses database statements. Parser 106 may translate the database statements into a format (e.g., a tree) convenient for an execution engine to interpret. Tag handler 108 reads and stores tag 103b and stores the information contained in tag 103b in a manner such that the information in tag 103b is associated with statement 103a. Tag handler 108 may be a part of, contained within, an extension of, a separate unit form parser 106, for example. Tag storage 110 is a storage area in long term or short term memory where tag handler 108 stores the information derived from tag 103b. Tag storage 110 may be a set of fields in the same records used for storing the parsed version of the database statements. In this embodiment, tag information derived from tag 103b is stored in the same record as the parsed version of statement 103a. In this specification information derived from a tag is to be understood as being generic to the tag itself, specifically the unaltered contents of the tag itself. Tag storage 110 may be a separate storage device, a separate storage media (e.g., a separate disk), or may be one or more regions within one or more storage media of one or more storage devices dedicated for storing tags, for example. The storage areas that make up Tag storage 110 may be regions dedicated to storing tag information or regions where the tag information happens to be stored currently, but is not any specific dedicated region.

Execution engine 112 interprets the parsed version of database statement 103a or otherwise converts the parsed version of database statement 103a into instructions that execution engine 112 carries out.

Tag implementer 114 retrieves the tag information stored in tag storage 110. Tag implementer may interpret the tag information or otherwise converts the tag information into instructions tag implementer 114 carries out. Tag implementer 114 may convert the tag information into instructions and/or a format that another component can handle. Tag implementer 114 may be a part of, contained within, an extension of, a separate unit from execution engine 112, for example.

Security module 116 enforces a security policy that protects the database server and/or it associated database from user 102 and/or database statement 103a from accessing data and/or components to which user 102 and/or database statement 103a are not entitled to access. In other words, security module 116 determines which components and/or data user 102 and/or database statement 103a are entitled to access. Security module 116 receives instructions and/or information from tag implementer 116, based on tag information derived from tag 103b, that relates to a level of security associated with database statement 103a and/or user 102.

User supplied routine handler 118 handles routines supplied by user 102 that specify procedures related to executing database statement 103a. User supplied routine handler 118 receives instructions and/or information from tag implementer 116, based on tag information derived from tag 103b, that relate how to process user supplied routines and/or which user supplied routines to use, for example.

Administrator 120 may be software or hardware used by a systems administrator that automatically performs and/or oversees various administrative functions such as scheduling the execution of database statements. Scheduling module 122 schedules database statement 103a for execution by execution engine 112. Scheduling module 122 may determine a priority level and/or receive an indication of a priority level associated with database statement 103a. Scheduling module 122 may then use the priority level to determine when to schedule database statement 103a for execution relative to other database statements. For example, if database statement 103a has a very high priority, the execution of other database statements may be stopped in order to free resources for executing statement 103a. Scheduling module 122 may be capable of automatically and/or manually scheduling statement 103a for execution. For example, a systems administrator may use scheduling module 122 to view the tag information derived from tag 103b and reschedule the execution of statement 103a. Scheduling module 122 may be a part of, contained within, an extension of, a separate unit form administrator 120, for example.

Security module 116, user supplied routine handler 118, and/or scheduling module 122 may also receive input, such as user context information, from other database components 105 relating to how to process statement 103a while a session window associated with statement 103a is still open. A session window refers to a period of time during which a communicative connection exists between user 102 and database 104.

Thus, user 102 issues statement 103a and associates tag 103b with statement 103a. Statement 103a and tag 103b are sent to database server 104. In database 104, parser 108 parses statement 103a. Tag handler stores tag 103b in tag storage 110 and maintains an association between the statement 103a and the stored information derived from tag 103b. Depending on the content of the tag information and/or the needs to security module 116, user supplied routine handler 118, and/or scheduling module 122, tag implementer 114 provides the tag information, other information based on the tag information, and/or instructions based on the tag information to security module 116, user supplied routine handler 118, and/or scheduling module 122. Security module 114, user supplied routine handler 118, and/or scheduling module 122 cause statement 103a to be executed by execution engine 112 and otherwise processed by administrator 102 and/or other components 105 in accordance with the tag information derived from tag 103b, regardless of whether the session window associated with user 102 is still open. After executing statement 103a, the execution results are returned to user 102.

Example of Exection Interface

An example of an execution interface for executing database statements with the tag field is DBMS_SQL.PARSE(cursor, statement, language flag, control tag)

In this example, the DBMS_SQL_PARSE parses an SQL statement. The first argument "cursor" is an integer that is used for keeping track of whether the SQL statement has executed. For example, the cursor may have a value of "0" if the SQL statement has executed and a value of "1" if the SQL statement has not executed. In an embodiment, "cursor" is an ID number of the cursor in which to parse the statement. The second argument "statement" contains the text of the SQL statement. The third argument "language" may contain an indication of the version the SQL statement is written, such as which version of Oracle to use. The final argument, "control tag," is an example of a tag field for inputting information for tag 103b, and may contain information identifying the application and/or user that issued the SQL statement.

For example, the execution interface may be
DBMS_SQL.PARSE(cursr,'SELECT * FROM emp', v7, 'resource=g1 id=scott')
In this example, an integer variable "cursr" contains the value of the cursor, the statement being parsed is
SELECT * FROM emp;
Although in this example, a select statement is used an update, delete or any other type of database statement may also be used. The value of the third argument is "v7", which indicates that the SQL statement was written using version 7 of SQL. The value of the control tag is "resource=g1 id=scott", which may indicate that the component or application issuing the SQL statement has ID "g1", and the ID of the user that wrote the database statement is "scott". Using this information, security module 116 may be able to determine a security level, and scheduling module 122 may be able to determine a priority level.

The DBMS_SQL.PARSE procedure, using parser 106, parses the given statement (e.g., statement 103a) in a given cursor. In an embodiment, all statements are parsed immediately, and in addition, DDL statements are run immediately when parsed. In an embodiment, the procedure concatenates elements of a PL/SQL table statement and parses the resulting string.

Monitoring Layer

A monitoring layer may be included in the database server that is capable of exposing the information in tag 103b. For example, the monitoring layer may include a function capable of returning performance data to administrator 120 and/or user 102. The data returned may also include a column showing the tag information associated with tag 103b.

An Example of an XML Syntax for a Tag

Furthermore, the tag can be sent in XML. By sending the tags in XML the database server can use standard routines to understand the metadata submitted by the applications or users. For example, a tag may be

```
<SQL attributes>
    <resource> g1 <>
    <id> scott <>
<SQL attributes>
```

In the above XML statements, the first "<SQL attributes>" indicates the beginning of the tag, and the second "<SQL attributes>". The name of the resource issuing the SQL statement is identified as "g1", where "<resource>" denotes the beginning of the resource name and "<>" denotes the end of the resource name. Similarly, the ID of the developer that wrote the SQL statement is identified as "scot", where "<id>" denotes the beginning of the ID and "<>" denotes the end of the ID.

Hardware Overview

Figure 2:
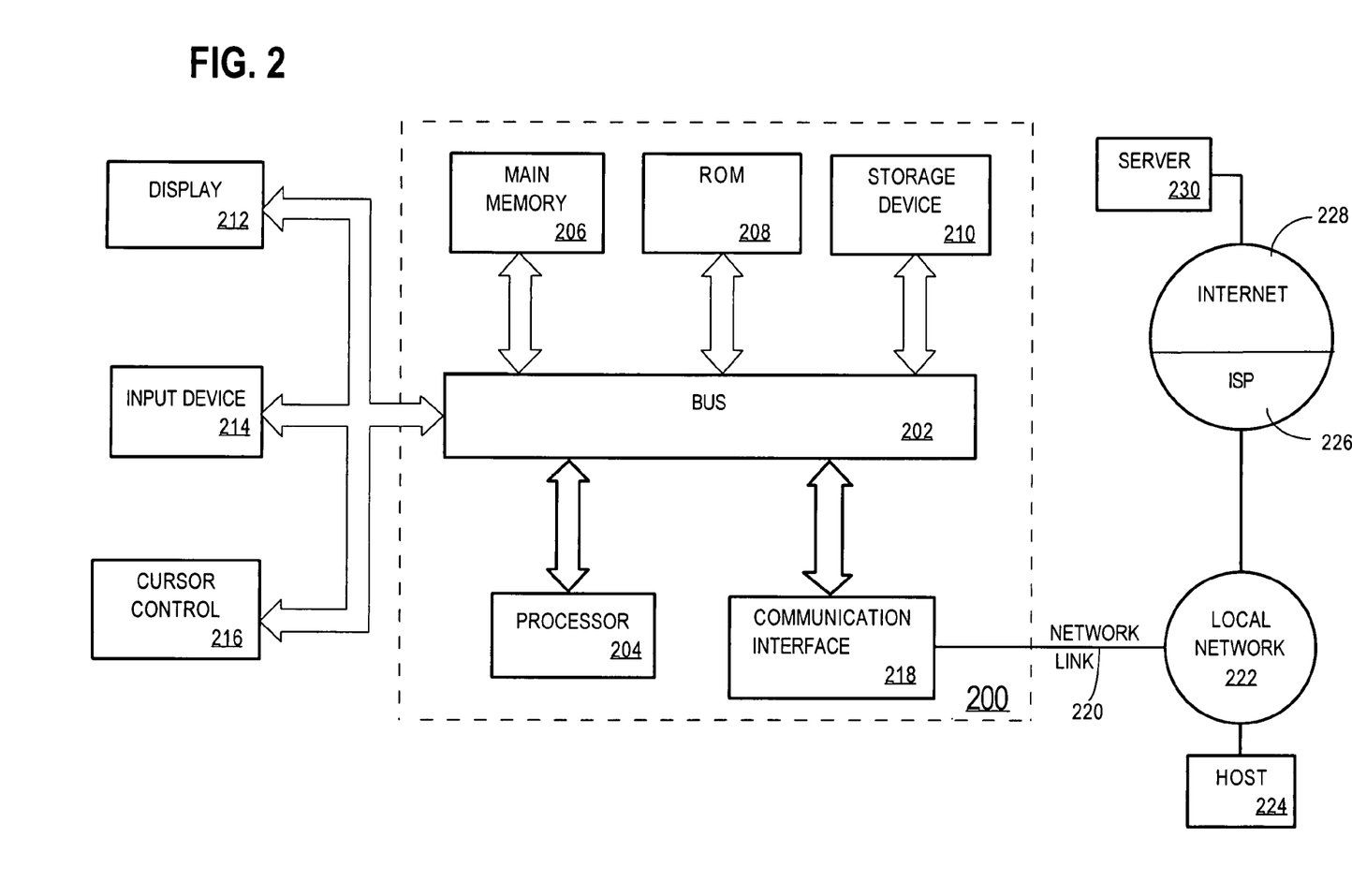
FIG. 2 is a block diagram that illustrates a computer system upon which an embodiment of the present invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. In an embodiment, client-side 102 and/or server-side 110 may reside on a machine such as computer system 200. In an embodiment, database 118 may be a machine such as computer system 200. According to one embodiment of the invention, the techniques described herein are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. The computer-readable medium is just one example of a machine-readable medium, which may carry instructions for implementing any of the methods and/or techniques (e.g., method 500) described herein. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed:

1. A machine-implemented method for executing a database statement, the method comprising the steps of:
    a database server receiving a request to execute the database statement, wherein the request includes the database statement and a tag that does not conform to a database language of said database statement, wherein said tag is not embedded in said database statement;
    wherein said tag specifies at least one parameter field and at least one parameter value; in response to receiving the request, said database server storing information from the tag in a manner that is associated with said database statement and accessible to a tag access mechanism; and
    said database server executing said database statement, wherein during execution of said database statement said database server provides access to one or more of the at least one parameter value through said tag access mechanism provided by said database server.

2. The method of claim 1, wherein the database statement is written in a language in which results desired are specified by the database statement, and no procedures for obtaining the results desired are specified by the database statement.

3. The method of claim 1, wherein a priority for executing the database statement is determined based on the at least one parameter value.

4. The method of claim 1, wherein a security level is associated with the at least one parameter such that whether the database is entitled to access a component is based on the at least one parameter.

5. The method of claim 1, wherein the at least one parameter is accessible to a systems administrator.

6. The method of claim 1, wherein the at least one parameter is related to user context information.

7. The method of claim 1, wherein the tag comprises an indicator of a beginning of the tag, and an indicator of an end of the tag.

8. The method of claim 7, wherein the at least one parameter value is located between the indicator of the beginning and the indicator of the end of the tag.

9. The method of claim 8, wherein each of the at least one parameter fields comprises an indicator of a beginning of the parameter field, followed by the parameter value, which in turn is followed by an indicator of an end of the parameter field.

10. The method of claim 1, wherein the at least one parameter value can be accessed without accessing memory allocated to a database session, wherein the database statement was issued within the database session.

11. The method of claim 4, wherein the at least one parameter value can be accessed without accessing memory allocated to a database session, wherein the database statement was issued within the database session.

12. The method of claim 2, wherein the at least one parameter value can be accessed without accessing memory allocated to a database session, wherein the database statement was issued within the database session.

13. The method of claim 1, wherein the at least one parameter value can be accessed after a session window has closed, wherein the database statement was issued within the session window.

14. A non-transitory machine-readable storage medium storing one or more sequences of instructions, which when executed by one or more processors, cause:
    a database server receiving a request to execute a database statement, wherein the request includes the database statement and a tag that does not conform to a database language of said database statement, wherein said tag is not embedded in said database statement;

wherein said tag specifies at least one parameter field and at least one parameter value; in response to receiving the request, said database server storing information from the tag in a manner that is associated with said database statement and accessible to a tag access mechanism; and said database server executing said database statement, wherein during execution of said database statement said database server provides access to one or more of the at least one parameter value through said tag access mechanism provided by said database server.

15. The non-transitory machine-readable storage medium of claim 14, wherein the database statement is written in a language in which results desired are specified by the database statement, but no procedures for obtaining the results desired are specified by the database statement.

16. The non-transitory machine-readable storage medium of claim 14, wherein a priority for executing the database statement is determined based on the at least one parameter value.

17. The non-transitory machine-readable storage medium of claim 14, wherein the at least one parameter is accessible to a systems administrator.

18. The non-transitory machine-readable storage medium of claim 14, wherein the at least one parameter is related to user context information.

19. The non-transitory machine-readable storage medium of claim 14, wherein the tag comprises an indicator of a beginning of the tag, and an indicator of an end of the tag.

20. The non-transitory machine-readable storage medium of claim 19, wherein the at least one parameter value is located between the indicator of the beginning and the indicator of the end of the tag.

21. The non-transitory machine-readable storage medium of claim 20, wherein each of the at least one parameter fields comprises an indicator of a beginning of the parameter field, followed by the parameter value, which in turn is followed by an indicator of an end of the parameter field.

22. The non-transitory machine-readable storage medium of claim 14, wherein the at least one parameter value can be accessed without accessing memory allocated to a database session, wherein the database statement was issued within the database session.

23. The non-transitory machine-readable storage medium of claim 15, wherein the at least one parameter value can be accessed without accessing-memory allocated to a database session, wherein the database statement was issued within the database session.

24. The non-transitory machine-readable storage medium of claim 14, wherein the at least one parameter value can be accessed after a session window has closed, wherein the database statement was issued within the session window.

25. The non-transitory machine-readable storage medium of claim 14, wherein a security level is associated with the at least one parameter such that whether the database is entitled to access a component is based on the at least one parameter.

26. The non-transitory machine-readable storage medium of claim 25, wherein the at least one parameter value can be accessed without accessing-memory allocated to a database session, wherein the database statement was issued within the database session.

* * * * *

UNITED STATES PATENT AND TRADEMARK OFFICE
CERTIFICATE OF CORRECTION

PATENT NO. : 8,825,702 B2  
APPLICATION NO. : 10/786941  
DATED : September 2, 2014  
INVENTOR(S) : Wong Page 1 of 1

It is certified that error appears in the above-identified patent and that said Letters Patent is hereby corrected as shown below:

On the title page, column 2, item (57) under Abstract, line 10, delete "and or" and insert -- and/or --, therefor.

On title page 2, column 2, item (56) under Other Publications, line 9, delete "dc" and insert -- cd --, therefor.

In the Specification

In column 4, line 49, delete "used" and insert -- be used --, therefor.

In column 6, line 53, delete "Exection" and insert -- Execution --, therefor.

Signed and Sealed this  
Twenty-fourth Day of March, 2015

Michelle K. Lee  
*Director of the United States Patent and Trademark Office*